March 15, 1927.  R. C. PESSELL  1,620,916
MILKING MACHINE
Filed July 17, 1926  2 Sheets-Sheet 1

INVENTOR
ROBERT C. PESSELL

March 15, 1927.

R. C. PESSELL 1,620,916

MILKING MACHINE

Filed July 17, 1926 2 Sheets-Sheet 2

INVENTOR
ROBERT C. PESSELL,
by Bright & Bailey

Patented Mar. 15, 1927.

1,620,916

UNITED STATES PATENT OFFICE.

ROBERT CHARLES PESSELL, OF BATH, ENGLAND.

MILKING MACHINE.

Application filed July 17, 1926, Serial No. 123,144, and in Great Britain April 25, 1925.

This invention relates more particularly to that part of milking machines commonly known as teat cups and into which the teats of the animal are inserted as a necessary prelude to milking operations. It is almost universally the practice with milking machines to effect the milking operation by creating a vacuum in tubing leading from a milk receptacle to the teat cups, the requisite massaging action being obtained by the intermittent balancing or neutralizing of the influence of the vacuum inside a rubber lining of the teat cup, consequently the rubber lining is intermittently pressed against the animal's teat. In order to obtain an efficient action of the rubber lining it is necessary to have it very responsive to the changes in pressure so that it contracts and de-contracts with regularity of sequence and as nearly as possible approaching the proper degree of pressure during contraction. In order to achieve this state of affairs some manufacturers when assembling the teat cups apply an appreciable permanent tension to the rubber lining so that it is quite resilient and taut, to enable it to grip upon the animal's teat and to respond to the intermittent balancing or neutralizing of the vacuum inside the lining. The disadvantages of this form of teat cup after a short period of usage soon become apparent particularly for two reasons (1) the teat cup is not adaptable for different sizes of teats, and (2) the rubber lining owing to always being under tension begins to lose its resiliency with the result that animals are not properly milked which very often contributes towards or is wholly accountable for the falling off of the milk capacity or delivery of individual animals.

In view of these and other disadvantages it is considered a desideratum to provide a form of teat cup which obviates these disadvantages in order to obtain the maximum benefit of mechanical milking plants and to counteract the heretofore quite justified prejudice of farmers against mechanical milkers. This and other desiderata I achieve by the present invention which is broadly characterized in that the tension of the lining of a teat cup is readily adjustable without the necessity of disassembling the parts constituting the teat cup, by securing the ends of the liner in a pair of members which accommodate the liner, the said pair of members being capable of being moved in directions away from each other so as to place upon the liner a high tension, the two members being capable of being locked in this position, and readily unlocked to allow the stretched liner to reassert itself to its normal state.

I am aware that it has been proposed to apply tension to a rubber liner in a teat cup by passing through the base of the liner cup a threaded tubular member having a flange engaging the base of the liner, a nut being threaded on to the said tubular member, so that by rotating the nut against the base of the casing accommodating the liner, the liner is pulled taut. Such an arrangement however does not allow a very high tension to be applied to the liner, and further is not a quick means of releasing the tension.

In carrying the invention into practice the liner is preferably readily detachable without the necessity of skilled attention, so that a farm hand can easily examine or replace a liner. It is preferred to provide a liner in the form of a rubber cylinder with flanged or flared ends which are held against the outer ends of a pair of telescopic sleeves, milled annular nuts or other suitable means being threaded on to the sleeves for holding the flanged or flared ends of the liner in position. One of the said sleeves carries one or more abutments adapted to engage in slots cut into the other sleeve so that the two sleeves by a slight turning action can be locked under the tension of the rubber liner in selected relationship. Other suitable locking means may equally well be provided, for instance the outer sleeve may carry a small spring plunger adapted to engage in one of a number of recesses or apertures in the inner sleeve, a small knob or handle being provided for retracting the plunger when it is desired to alter the relative positions of the two sleeves.

In order that my invention may be clearly understood and readily carried into effect I have appended hereto two sheets of drawings illustrating an embodiment of same and wherein, Fig. 1 is an outside elevational view, partly in section, of a suitable form of teat cup embodying the principle of my invention, and showing the rubber liner stretched.

Figure 1:
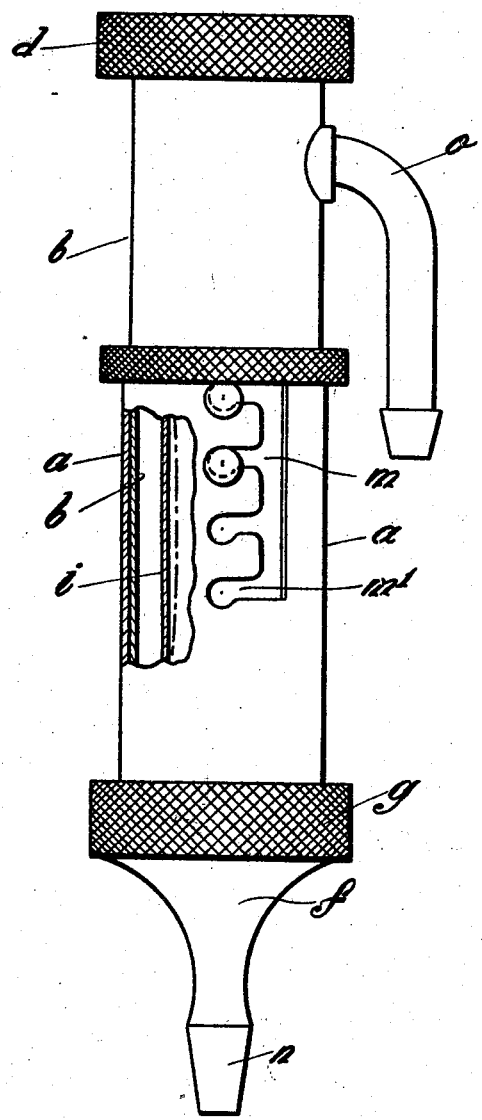
Figure 2:
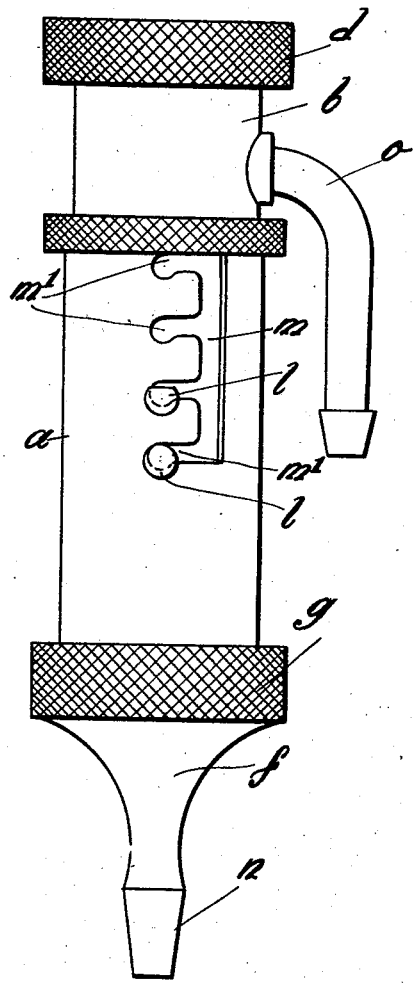
Fig. 2 is an elevation view showing the rubber liner relaxed.
Figure 3:
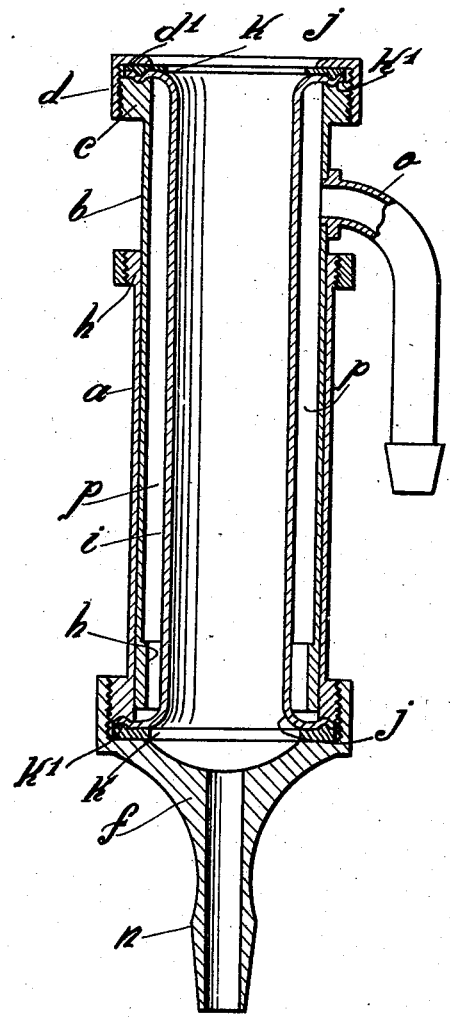
Fig. 3 is a sectional elevation of Fig. 2.

Referring to the drawings the embodiment of teat cup shown comprises a pair of cylindrical sleeves $a$ and $b$, one of which ($b$) has a nice sliding or telescopic fit in the other ($a$). The upper end of the sleeve $b$ is formed with a flange $c$ threaded to receive a milled ring $d$ having an annular overhang $d'$, the sleeve $a$ having a flanged lower end as at $e$ on to which is threaded a fitting $f$ having a milled periphery $g$. To reduce the risk of buckling or breakage of the sleeves $a$ and $b$ they are provided with ends of increased thickness of section as indicated at $h, h$.

The rubber liner, the form of which is an important feature of my invention comprises a rubber cylindrical body $i$ having flanged or flared ends $j$ one of which is interposed between the flanged end $e$ of the sleeve $a$ and the fitting $f$, whilst the other is interposed between the flanged end $c$ of the sleeve $b$ and the ring nut $d$. Suitable washers $k$ are preferably provided for interposition between the ring $d$ and the flange $c$, also between the fitting $f$ and the flange $e$. These washers $k$ are preferably provided each with a narrow annular projection $k'$ to provide a good bite on to the rubber liner to prevent it slipping. The flanges $c$ and $e$ have corresponding grooves to receive the parts of the flanges of the liner depressed by the projections $k'$. Alternatively a number of serrations, pointed projections, radial teeth or like equivalent gripping means may be provided on the washers $k$ or alternatively or in addition on the flanges $c$ and $e$, the flared or flanged ends $j$ also or alternatively having the serrations, etc. In the drawings the two sleeves $a$ and $b$ are shown in the position in which the liner $i$ is relaxed, i. e. with little or no tension applied to it. When the teat cup is in use the liner $i$ is under tension and this is effected by pulling the sleeves $a$ and $b$ in directions away from each other until the requisite tension on the liner $i$ is obtained, the two sleeves are then locked in the extended position. This locking of the two sleeves may be effected in a number of ways, a suitable and quite reliable method being that shown in the drawings in which a multiple point bayonet joint form of locking device is employed, the lateral abutment $l$ being carried by the sleeve $b$ and working in a linear slot $m$, in the sleeve $a$, the slot $m$ having a number of lateral abutment receiving slots $m'$ to receive the abutment $l$. In the drawings a pair of abutments $l$ are shown but this is obviously not essential although it increases the strength of the lock. The resiliency of the liner $i$ will permit of the necessary small degree of axial turning movement for engaging the abutments $l$ in, or disengaging them from the slots $m'$.

The suction or vacuum for drawing the milk from the liner $i'$ to the milk receptacle is applied to the interior of the liner $i$ by means of a flexible pipe leading to the milk receptacle and connected to a nipple $n$ comprising an integral or detachable part of the fitting $f$. This vacuum or suction has the result of contracting with an appreciable pressure the liner $i$ so that it presses upon the animal's teat. To obtain the necessary intermittency of this pressure the constant vacuum inside the liner $i$ is intermittently balanced by an equal degree of vacuum which is applied intermittently via the passage $o$ to the annular space $p$ surrounding the liner $i$. This intermittent vacuum which is applied to the space $p$ can be obtained by any suitable valve mechanism which alternately places the passage $o$ in communication with a source of suction and the atmosphere. In practice it is preferred to have one valve common to one or two complete sets of teat cups but if necessary a valve could be provided with the passage $o$, of each teat cup, by employing a suitable Bowden control for each valve, the control being operated from any suitable mechanism.

It will be readily appreciated that my invention enables an unskilled person to readily remove or replace a rubber liner thereby enabling different sizes of liners to be employed, and unserviceable liners easily replaced.

What I claim is:—

1. In milking apparatus, a teat cup comprising a casing composed of a pair of telescopically connected sleeves, means for securing said sleeves in different telescopically adjusted positions with respect to one another, a clamp nut threaded on the outer end of each of said sleeves, and an elastic liner within said casing detachably connected at its ends with the outer ends of said sleeves, respectively, by said clamp nuts.

2. In milking apparatus, a teat cup comprising a casing composed of a pair of telescopically connected sleeves, a nut threaded on the outer end of each sleeve, an elastic liner within said casing and outwardly extending flanges at the ends of said liner clamped by said nuts to the outer ends of said sleeves, respectively.

In witness hereof I have signed this specification.

R. C. PESSELL.